US008116222B1

(12) United States Patent
Bollay

(10) Patent No.: US 8,116,222 B1
(45) Date of Patent: Feb. 14, 2012

(54) METHODS AND SYSTEMS FOR EMBEDDING TRAFFIC STATE INFORMATION WITHIN ETHERNET TRAILERS

(75) Inventor: Benn Bollay, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 64 days.

(21) Appl. No.: 12/488,263

(22) Filed: Jun. 19, 2009

Related U.S. Application Data

(60) Provisional application No. 61/074,580, filed on Jun. 20, 2008.

(51) Int. Cl.
*H04L 12/56* (2006.01)
(52) U.S. Cl. ...................................................... 370/252
(58) Field of Classification Search .......... 370/241–253, 370/351, 389, 392, 395.1, 395.5–395.52
See application file for complete search history.

(56) References Cited

U.S. PATENT DOCUMENTS 5,815,516 A * 9/1998 Aaker et al. .................. 714/807
5,826,032 A * 10/1998 Finn et al. .................... 709/236

OTHER PUBLICATIONS

Leffler et al, Trailer Encapsulations, RFC 893, 7 pages, Apr. 1984.*
Braden, Requirements for Internet Hosts—Communication Layers, RFC 112, 116 pages, Oct. 1989.*

* cited by examiner

*Primary Examiner* — Frank Duong
(74) *Attorney, Agent, or Firm* — LeClairRyan, a Professional Corporation

(57) ABSTRACT

Methods and systems for creating a back channel between two network nodes using a packet trailer. The sending node establishes a communication channel between itself and the destination node. A packet is prepared having a header and a payload. Data associated with the tasks of the back channel from a lower data link layer is written into a trailer on the header. The packet is received at the second node and the data in the trailer is read. The trailer is stripped out prior to sending the packet to a higher layer of the destination node.

20 Claims, 4 Drawing Sheets

METHODS AND SYSTEMS FOR EMBEDDING TRAFFIC STATE INFORMATION WITHIN ETHERNET TRAILERS

PRIORITY CLAIM

This application claims priority from U.S. Provisional Application No. 61/074,580 filed Jun. 20, 2008 and hereby incorporates by reference the entirety of that application.

FIELD OF THE INVENTION

This invention generally relates to network communications and more particularly, to a method and systems for sending node data through an Ethernet trailer.

BACKGROUND

Commonly known local area networks (LAN) such as an Ethernet based network communicate data via packets having a set format. Control of packet traffic in a network is critical to insure balanced communication flow and efficient transmission. Such packets are sent between a source network node and a destination node over a communication medium such as coaxial cable or twisted pair wire. Each packet typically has a header that contains limited routing information, and a payload. The amount of information in the header is limited to a destination node address and is fixed for the packet. Thus, dynamic information such as the state of various network devices that could be useful for traffic control is not available during the routing of the packet.

The most common method of local area network communication is the Ethernet protocol that is a family of frame-based computer networking technologies for local area networks. The Ethernet protocol is standardized as IEEE 802.3 and defines a number of wiring and signaling standards for the physical layer, through means of network access at the Media Access Control (MAC)/Data Link Layer, and a common addressing format.

The combination of the twisted pair versions of Ethernet for connecting end systems to the network, along with the fiber optic versions for site backbones, is the most widespread wired LAN technology. Ethernet nodes communicate by sending each other data packets that are individually sent and delivered. Each Ethernet node in a network is assigned a 48-bit MAC address. The MAC address is used both to specify the destination and the source of each data packet in the header. Network interface cards (NICs) or chips on each node normally do not accept packets addressed to other Ethernet nodes.

There have been a number of legacy Ethernet features that do not have any present application. For example, a trailer of variable size may be added to the end of an Ethernet packet according to RFC 893, and may contain information such as CRC values. Network resources may strip away the information contained in the trailer (e.g., a CRC value) and payload portions of the packet. This was standardized by RFC893 to allow certain platforms to process packets aligned on page boundaries by moving variable length header fields to the end of the packet. However, the physical layer devices still forward packets that contain an arbitrary amount of data in the trailer after the proper end of the data payload in the packet. Identifying this data requires a conceptual packet length, for example the length filed in the header of the packet. Once the payload length has been determined, any trailing data may be identified and consumed by an appropriate monitoring agent such as a receiving node. Once the packet enters the stack in the node, the node will strip off any trailing data before passing upwards to the next layer. Trailers are strictly a link level packet format and are not visible (when properly implemented) in any higher level protocol processing.

SUMMARY

According to one example, a method for back channel communication using a lower data link layer involving two nodes in a network is described. A communication channel is established between the two nodes. A packet is prepared having a header, a payload and a trailer. Data associated with tasks of the back channel is written into the trailer on the header. The packet is received at the second node and the data in the trailer is read. The trailer is stripped out prior to sending the payload to a higher layer of the node.

According to another example, a machine readable medium having stored thereon instructions for establishing a back channel communication between the data link layers involving two network nodes is disclosed. The stored instructions include machine executable code, which when executed by at least one machine processor, causes the machine to establish a communication channel between the two nodes. The instructions further cause the machine processor to prepare a packet having a header, a payload and a trailer. The instructions further cause the machine processor to write data associated with the tasks of the back channel into the trailer on the header. The instructions further cause the machine processor to receive the packet at the second node and reading the data in the trailer. The instructions further cause the machine processor to strip out the trailer prior to sending the packet to a higher layer of the node.

Another example is a network node on an Ethernet based local area network. The network node includes a network interface for a communication channel to another network node. The network node includes a lower data link layer. The network node includes a controller for preparing a packet having a header and a payload. The controller writes data associated with tasks of a back channel from the data link into a trailer on the header for back channel communication to another network node.

Additional aspects will be apparent to those of ordinary skill in the art in view of the detailed description of various embodiments, which is made with reference to the drawings, a brief description of which is provided below.

Figure 1:
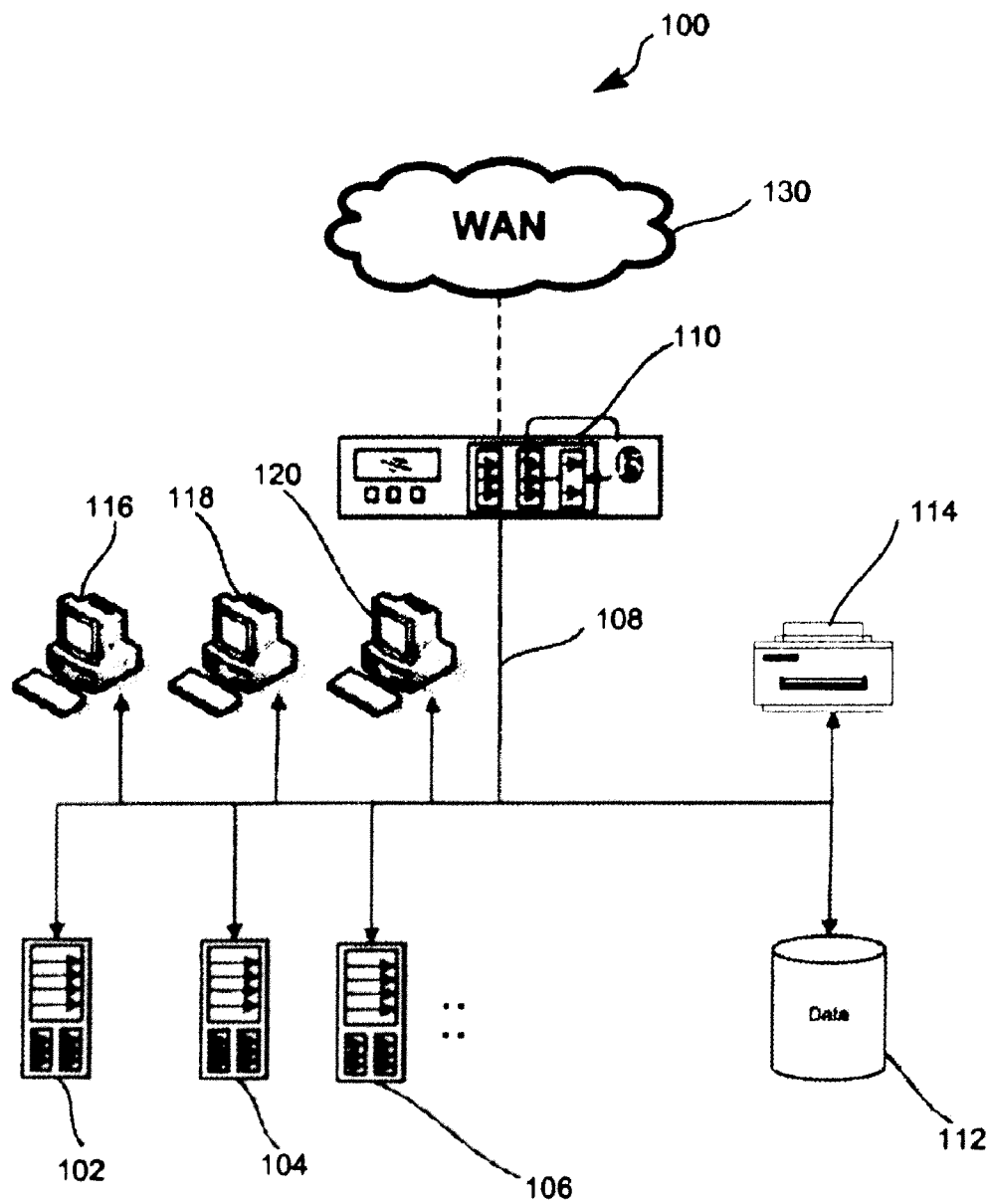
FIG. 1 is a block diagram of an example network system including a plurality of network nodes that use packets with a trailer to send back channel data such as traffic management data.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

Currently, the ability to guarantee useful network functions such as diagnostics or intelligent traffic routing is limited by lack of information available to a node from a received packet. The header and payload of a packet which provide direct communication between nodes have inaccessible data that cannot be used for more advantageous network functions at network levels.

FIG. 1 shows a network system 100 that may include a series of one or more application servers 102, 104 and 106 and at least one optional traffic management device 110 in a private local area network 108. The application servers 102, 104, 106 and the traffic management device 110 may be network nodes of the private local area network 108. The private local area network 108 may also include other nodes such as a storage device 112, a printer 114 and workstations 116, 118 and 120. In this example, the traffic management device 110 is logically interposed between the network nodes such as the application servers 102, 104 and 106 in the private local area network 108, although other arrangements may be used in other network environments. It is to be understood that the servers 102, 104 and 106 may be hardware or software or may represent a system with multiple servers which may include internal networks. In this example the servers 102, 104 and 106 may be hardware server devices operating any version of Microsoft® IIS servers and/or Apache® servers, although other types of servers may be used. Further, additional servers and workstations and other devices may be coupled to the system 100 or the private local area network 108 and many different types of applications may be available on servers coupled to the system 100. As will be explained below, the private local area network 108 may allow network nodes to exchange packets that include trailers having back channel data, such as traffic management data. Each of the network nodes, such as application servers 102, 104 and 106, traffic management device 110, storage device 112, printer 114 and workstations 116, 118 and 120, include a network interface such as a network interface card for establishing a communication channel to another network node.

In this example, the traffic management device 110 may be the BIG-IP® traffic manager available from F5 Networks, Inc. of Seattle, Wash. The traffic management device 110 may provide a connection to a wide area network (WAN) 130 and manage traffic to and from the wide area network 130 to the private local area network 108. The wide area network 120 may include any publicly accessible network environment, such as the Internet, which includes network components, such as public servers that are not directly managed or under direct control by the traffic management device 110, yet whose operation may still be influenced in unique, novel and unexpected ways in response to TCP/IP protocol directives strategically purposefully determined and sent from the traffic management device 110 to make the private local area network 108, and perhaps the wide area network 120, operate more efficiently, as will be described in greater detail herein. It should be noted, however, that the ensuing descriptions of the various functionalities relating to the private servers 102, 104 and 106 are generally applicable to the network devices coupled to the wide area network 130, and thus the remaining description will simply refer to either one as servers 102, 104 and 106 unless noted otherwise.

In this example, the private local area network 108 may be a local area network (LAN) environment employing any suitable interface mechanisms and communications technologies including, for example telecommunications in any suitable form (e.g., voice, modem, and the like), Public Switched Telephone Network (PSTNs), Ethernet based Packet Data Networks (PDNs), combinations thereof, and the like. Moreover, private local area network 108 may be made up of one or more interconnected LANs located in substantially the same geographic location or geographically separated, although the private local area network 108 may include other types of networks arranged in other configurations. Moreover, the private local area network 108 may include one or more additional intermediary and/or network infrastructure devices in communication with each other via one or more wired and/or wireless network links, such as switches, routers, modems, or gateways (not shown), and the like, as well as other types of network devices including network storage devices.

The traffic management device 110 may be interposed between the servers 102, 104 and 106 and the wide area network 120 as shown in FIG. 1. From the perspective of the clients of the wide area network 120, they have directly established a connection in the usual way to the appropriate servers 102, 104 and 106 and respective server applications. The existence of a proxy connection may be entirely transparent to a requesting client computer. The implementation of such a proxy may be performed with known address spoofing techniques to assure transparency, although other methods could be used. The traffic management device 110 may provide high availability of IP applications/services running across multiple servers such as the servers 102, 104 and 106.

In this example, the traffic management device 110 may include a traffic management OS which may have a modular structure with different modules to perform various network traffic management functions. In this example, the modules of the traffic management OS may include a local traffic management module that may be used to analyze traffic data and manage traffic between nodes of the private local area network 108 in FIG. 1. It is to be understood that the network traffic management modules of the traffic management OS may also be run on other nodes of the private local area network 108. The traffic management OS features architectural elements of a proxy approach, high-speed performance, modular functionality. The traffic management OS in this example may be customized to the needs of a particular network.

An example of the traffic management OS may be the TMOS® platform available from F5 Networks, Inc. of Seattle, Wash., although other traffic management applications could be used. The traffic management OS may provide functions such as performance, security, availability and management. The traffic management OS may provide shared application services such as iRules, rate shaping, resource cloaking, transaction assurance, universal persistence, caching, compression, encryption, authentication, application health monitors and application switching that are run by the application modules. The traffic management OS may also provide shared network services including TCP Express™, protocol sanitization, high performance SSL, DoS and DDos protection, VLAN segmentation, line rate switching, IP packet filtering, dynamic routing, secure network address translation, port mapping and common management framework.

Communications between the network nodes on the private local area network 108 may be conducted via the Ethernet standard in this example. Communications may be made in a data payload in an Ethernet packet sent between a source node and a destination node on the private local area network 108. The Ethernet standard may allow a trailer to be added to Ethernet packets according to RFC 893 by a source node. The physical layer of the node device still forwards packets that contain an arbitrary but up to a maximum transmission unit (MTU) amount of data after the proper end of the data payload in the packet. Once the trailer length has been determined, any trailing data of the packet may be identified and consumed by an appropriate monitoring agent such as an algorithm or application on the destination node.

Once the packet enters the destination node, the destination node will strip off any trailer data before passing the payload upwards to the next layer in the destination node. Trailers are strictly a data link level packet format and are not visible (when properly implemented) in any higher level protocol processing at the node. The trailer thus creates a back channel between the data link level layers of the nodes of the private local area network 108.

Figure 2:
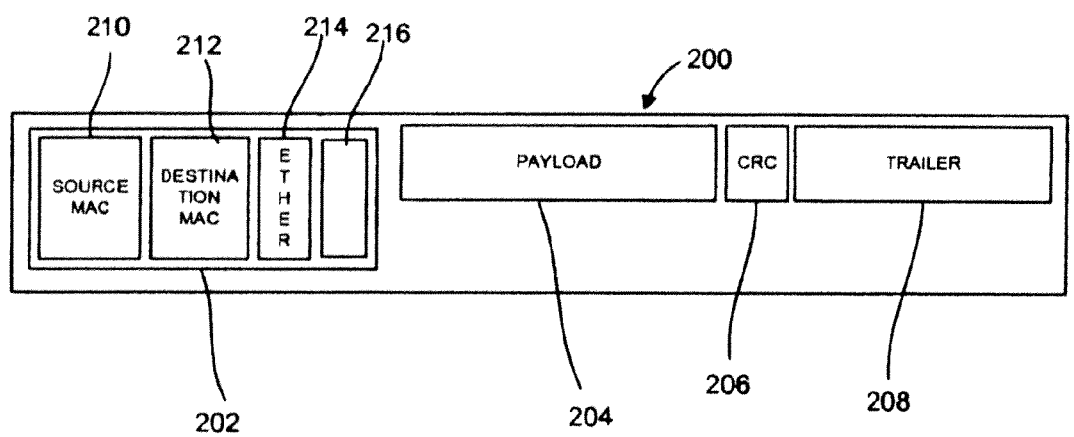
FIG. 2 is a block diagram of a packet with the attached trailer used in the network system of FIG. 1.

FIG. 2 is a block diagram of a packet 200, which when assigned a trailer according to RFC893, may be used as a back channel between nodes on the private local area network 108 in FIG. 1. The packet 200 may include a header 202, a payload 204, a CRC field 206, and a trailer 208. The header 202, payload 204, and CRC field 206 may all be a set length according to the Ethernet protocol. The trailer length is a variable having a value up to a limit set by the maximum transmission unit for the private local area network 108. The header 202 in turn includes a source MAC address field 210, a destination MAC address field 212 and an Ether type field 214 that may be written by the source node. The header 202 also includes a trailer payload length field 216 that may include the length of the trailer 208.

Since the Ethernet frame allows trailers to be specified over communication links, this provides an opportunity for packet flow state information to be passed directly between the destination and source nodes unknown to the operational components of the nodes. In addition, debugging information may be inserted in the trailer such as per-packet upstream routing and security of priority judgments. Of course other issues that require decisions to be made on a per packet or per flow basis in a separate computation unit then where the result must be applied may use the trailer.

The nodes of the private local area network 108 may include various diagnostic or traffic information in the trailer of the packets when they send packets to other nodes in the private local area network 108. When the packet is received by a destination node, the trailer is stripped away and the information may be read by a diagnostic or traffic management application. In this example, such data may include information about the internal state of the packet from a node such as the servers 102, 104 and 106 or the traffic management device 110. Such information may include the core initiating the packet, the connections of the nodes, flags that may be set, and operational descriptions. Additional information may include connection flags, the type of connection, physical interfaces, the VLAN identification of related connections and addresses, and various security assessments or guarantees. The information may be used by diagnostic tools such as TCP Dump. Other applications may include router topology exchange and content filters of the payload which may aid in network traffic management by the network via the traffic management device 110. Still other applications may be using the information for a security or intrusion detection system to scan or cryptographically sign/verify individual packets as they pass within the system 100.

Figure 4:
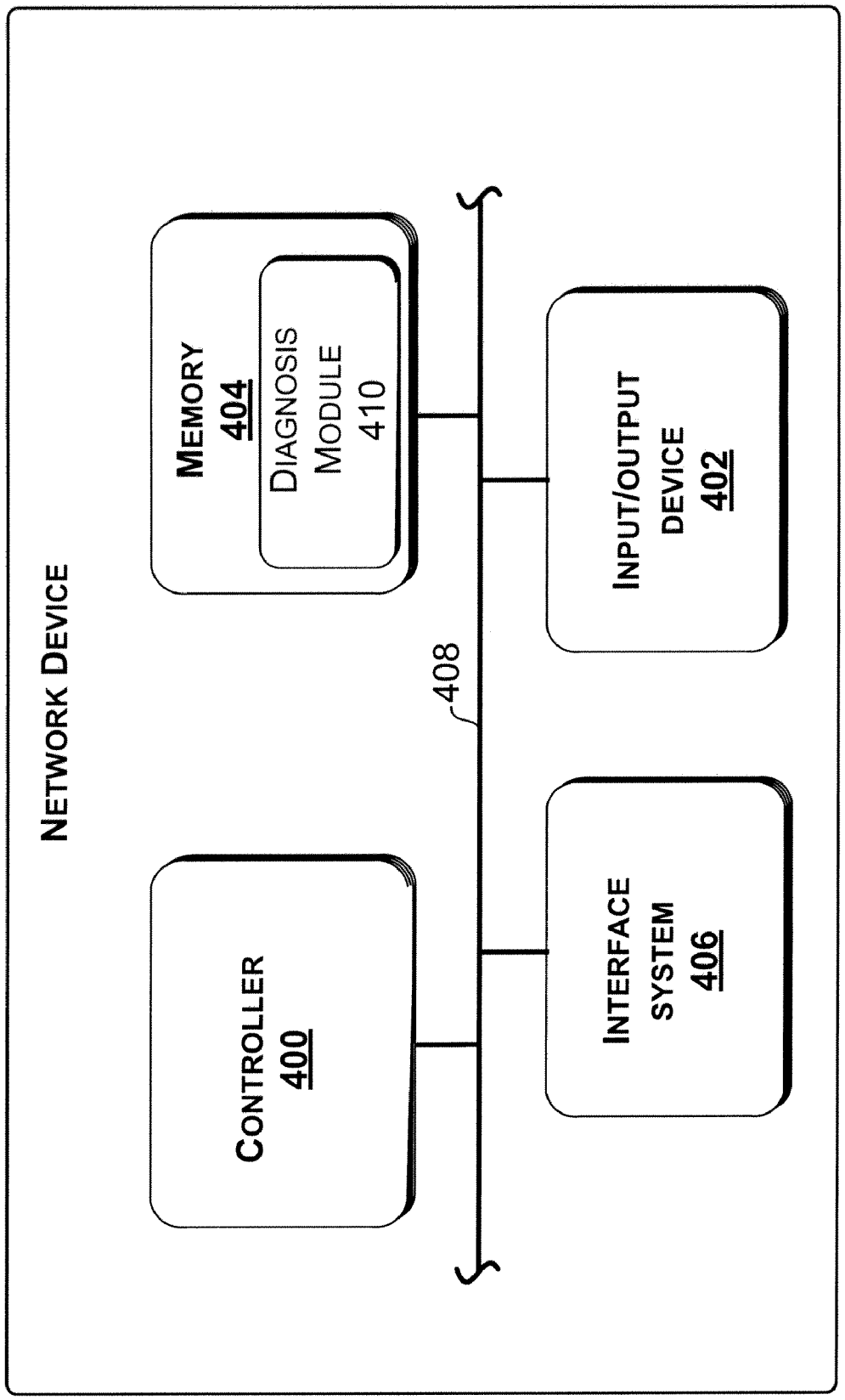
FIG. 4 illustrates a block diagram of a network device in accordance with an aspect of the present disclosure.

Each of the client computers 116, 118 and 120, servers 102, 104 and 106, and the traffic management device 110 described above, and shown in FIG. 4, may include a central processing unit (CPU) (also referred to as a controller or processor) 400, an input/output system 402, a memory 404, and an interface system 406 which are coupled together by a bus 408 or other link, although other numbers and types of each of the components and other configurations and locations for the components can be used. The processor 400 in the traffic management device 110 may execute a diagnosis module 410 which is a program of stored instructions for one or more aspects of the methods and systems as described herein, including for diagnostics or network traffic management, although the processor could execute other types of programmed instructions. The memory 404 may store these programmed instructions for one or more aspects of the methods and systems as described herein, including the method for increasing the transmission efficiency, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, may be used for the memory. The user input device of the input/output system 402 may comprise a computer keyboard and a computer mouse, although other types and numbers of user input devices may be used. The display of the input/output system 402 may comprise a computer display screen, such as a CRT or LCD screen by way of example only, although other types and numbers of displays could be used.

Although an example of the traffic management device 110 is described and illustrated herein in connection with FIG. 1, each of the computers of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s).

Furthermore, each of the systems of the system 100 may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software and networking arts.

In addition, two or more computing systems or devices may be substituted for any one of the systems in the system 100. Accordingly, principles and advantages of distributed processing, such as redundancy, replication, and the like, also can be implemented, as desired, to increase the robustness and performance of the devices and systems of the system 100. The system 100 may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

Figure 3:
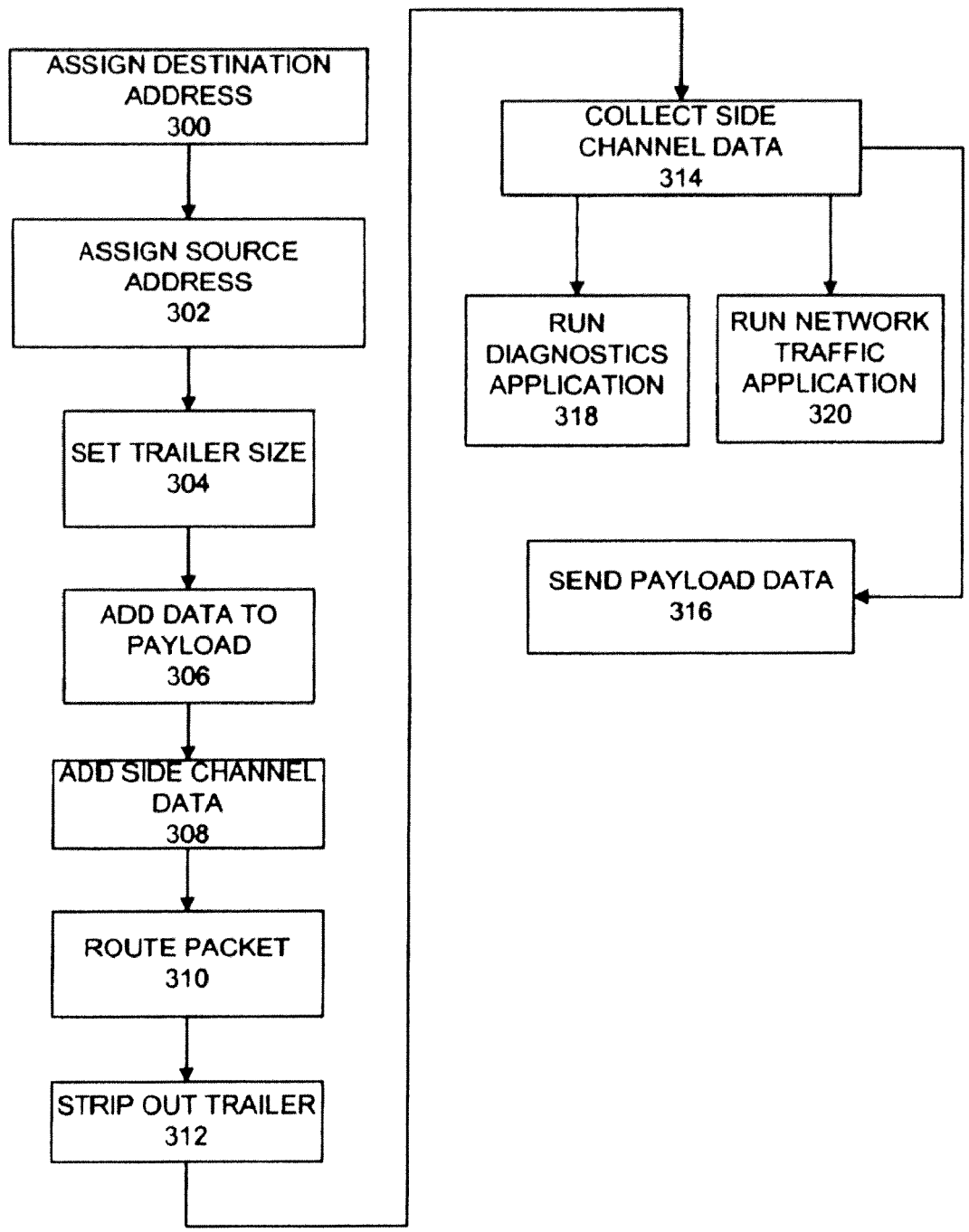
FIG. 3 illustrates a flow chart of embedding information such as traffic information in the trailer to provide a back channel between nodes of the network system of FIG. 1.

The operation of the example packet trailer back channel for a system 100, shown in FIG. 1, which may be run on the traffic management device 110 or any of the other nodes in the private local area network 108, will now be described with reference back to FIG. 1 in conjunction with the flow diagram shown in FIG. 3. The flow diagram in FIG. 3 is representative of exemplary high level steps that one of ordinary skill in the art would be able to use for generating machine readable instructions to implement the data transmission process as set forth herein without undue experimentation. In this example, the machine readable instructions comprise an algorithm for execution by: (a) a processor, (b) a controller, and/or (c) one or more other suitable processing device(s). The algorithm may be embodied in software stored on tangible computer readable media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the traffic management device 110 could be implemented by software, hardware, and/or firmware. Also, some or all of the machine readable instructions represented by the flowchart of FIG. 3 may be implemented manually. Further, although the example algorithm is described with reference to the flowchart illustrated in FIG. 3, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 3 is a flow diagram of the procedure that may be employed by the network nodes in FIG. 1 to establish a back channel at the data link layer through an added trailer to Ethernet packets such as that shown in FIG. 2 sent between a source and destination node on the private local area network 108 in FIG. 1. A source node such as the workstation 116 in FIG. 1 assigns a destination address to the destination MAC address field for a packet such as the packet 200 shown in FIG. 2 (300). The source node then writes its corresponding MAC address to the source MAC address field in the packet (302). The source node then sets the size for the trailer in the trailer payload length field (304). The source node then adds the data in the payload of the packet (306). The sender node will then insert back channel data in the trailer (308). The back channel data may be directed toward various network functions such as diagnostics analysis or network traffic analysis.

The packet is then routed on the private local area network 108 to the destination node such as the workstation 118 in FIG. 1 (310). The destination node will then strip out the trailer from the packet (312). The data in the trailer is read by the destination node and may be collected for storage (316). The destination node then sends the data in the payload to the application layer of the destination node (314). The data from the trailer may be immediately used or collected for various applications (316). In this example, the data in the trailer may be used for a diagnostics application that may collect data from a number of different network nodes for historic analysis or to continuously gather data in real time (318). The collected data may be then used for diagnostics functions such as to evaluate the performance of the network, nodes and devices that may require repair or maintenance. The data in the trailer may also be directed toward a network traffic application such as a local traffic manager on the traffic management device 110 in FIG. 1 for historic analysis or to continuously gather data in real time (320). Such traffic data may be used by the traffic management device 110 in FIG. 1 to cause more efficient packet traffic on the network 108 or to and from an external network such as the WAN 130 in FIG. 1. Another example may be using the data for a security or intrusion detection system to scan or cryptographically sign/verify individual packets as they pass within a system.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for back channel communication using a lower data link layer, involving a first node and a second node in a network, the method comprising:
   establishing a communication channel between a first node and a second node;
   preparing, at the first node, a packet having a header, a payload and a trailer;
   modifying, at the first node, the packet by writing data associated with one or more network functions associated with a back channel into the trailer on the header;
   transmitting the modified packet from the first node to the second node via a lower data link layer, wherein the modified packet is configured to allow the second node, upon receiving the packet, to read the data in the trailer and strip the trailer prior to sending the packet to a higher layer of the second node.

2. The method of claim 1, further comprising routing the packet from the second node to another network node.

3. The method of claim 1, wherein the packet is an Ethernet packet and the communication channel is an Ethernet link.

4. The method of claim 1, wherein the data in the trailer includes data relating to network traffic.

5. The method of claim 4, further comprising:
   collecting the data in the trailer; and
   applying a network traffic application to analyze network traffic based on the collected data.

6. The method of claim 1, wherein the data includes data relating to diagnostic analysis of the network.

7. The method of claim 6, further comprising:
   collecting the data in the trailer; and
   applying a diagnostics application to analyze the network based on the collected data.

8. A machine readable non-transitory medium having stored thereon instructions for establishing a back channel communication using a lower data link layer involving a first network node and a second network node, the stored instructions comprising machine executable code, which when executed by at least one machine processor, causes the machine to:
   establish a communication channel between a first node and a second node;
   prepare a packet having a header, a payload and a trailer;
   modify the packet by writing data associated with one or more network functions associated with a back channel into the trailer on the header;
   transmit the modified packet from the first node to the second node via a lower data link layer, wherein the modified packet is configured to allow the second node, upon receiving the packet, to read the data in the trailer and strip the trailer prior to sending the packet to a higher layer of the second node.

9. The machine readable non-transitory medium of claim 8, wherein the stored instructions, which when executed by at least one machine processor cause the machine to route the packet from the second node to another network node.

10. The machine readable non-transitory medium of claim 8, wherein the packet is an Ethernet packet and the communication channel is an Ethernet link.

11. The machine readable non-transitory medium of claim 8, wherein the data in the trailer includes data relating to network traffic.

12. The machine readable non-transitory medium of claim 8, wherein the stored instructions, which when executed by at least one machine processor cause the machine to:
collect the data in the trailer; and
apply a network traffic application to analyze network traffic based on the gathered data.

13. The machine readable non-transitory medium of claim 12, wherein the data includes data relating to diagnostic analysis of the network.

14. The machine readable non-transitory medium of claim 13, wherein the stored instructions, which when executed by at least one machine processor cause the machine to:
collect the data in the trailer; and
apply a diagnostics application to analyze the network based on the gathered data.

15. A network node on an Ethernet based local area network, the network node comprising:
a network interface configured to establish a communication channel to another network node;
a memory configured to store one or more programming instructions; and
a controller configured to execute the stored programming instructions, which when executed, result in the controller:
preparing a packet having a header, a payload and a trailer;
modifying the packet by writing data associated with one or more network functions associated with a back channel into the trailer on the header;
transmitting the modified packet to the another network node via a lower data link layer, wherein the modified packet is configured to allow the another network node to read the data in the trailer and strip the trailer prior to sending the payload to a higher layer of the second node.

16. The network node of claim 15, wherein the controller routes the packet from the network node to another network node.

17. The network node of claim 15, wherein the packet is an Ethernet packet and the communication channel is an Ethernet link.

18. The network node of claim 15, wherein the data in the trailer includes data relating to network traffic.

19. The network node of claim 18, wherein the controller collects the data in the trailer and a network traffic application is applied to analyze network traffic based on the collected data.

20. The network node of claim 15, wherein the data includes data relating to diagnostic analysis of the network.

* * * * *